(12) United States Patent
Birkestrand et al.

(10) Patent No.: US 8,074,225 B2
(45) Date of Patent: *Dec. 6, 2011

(54) ASSURING RECOVERY OF TEMPORARY RESOURCES IN A LOGICALLY PARTITIONED COMPUTER SYSTEM

(75) Inventors: Daniel Charles Birkestrand, Rochester, MN (US); Terry Lyle Schardt, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 852 days.

This patent is subject to a terminal disclaimer.

(21) Appl. No.: 12/134,799

(22) Filed: Jun. 6, 2008

(65) Prior Publication Data

US 2008/0244609 A1    Oct. 2, 2008

Related U.S. Application Data

(63) Continuation of application No. 10/616,675, filed on Jul. 10, 2003, now Pat. No. 7,594,231.

(51) Int. Cl.
*G06F 9/46*     (2006.01)
(52) U.S. Cl. ...................................................... 718/104
(58) Field of Classification Search .................. 718/104
See application file for complete search history.

(56) References Cited

U.S. PATENT DOCUMENTS

| | | | |
|---|---|---|---|
| 7,136,800 B1 | 11/2006 | Vega | |
| 7,146,496 B2 | 12/2006 | Circenis et al. | |
| 7,155,735 B1 | 12/2006 | Ngo et al. | |
| 2002/0156824 A1 | 10/2002 | Armstrong et al. | |
| 2003/0018870 A1 | 1/2003 | Abboud et al. | |
| 2003/0135580 A1 | 7/2003 | Camble et al. | |
| 2004/0111308 A1 | 6/2004 | Yakov | |
| 2004/0148511 A1 | 7/2004 | Circenis et al. | |
| 2004/0194089 A1 | 9/2004 | McCarthy et al. | |
| 2004/0199632 A1 | 10/2004 | Romero et al. | |
| 2005/0010502 A1 | 1/2005 | Birkestrand et al. | |
| 2006/0190615 A1 | 8/2006 | Panwar et al. | |
| 2006/0294238 A1 | 12/2006 | Naik et al. | |

FOREIGN PATENT DOCUMENTS

| | | |
|---|---|---|
| JP | 2001331333 A | 11/2001 |
| JP | 2002024192 A | 1/2002 |
| JP | 2002041304 A | 2/2002 |
| JP | 2003067351 A | 3/2003 |
| TW | 439031 A4 | 6/2001 |
| WO | 0237275 A2 | 5/2002 |
| WO | 02/86698 A1 | 10/2002 |

OTHER PUBLICATIONS

Katharina Friedmann, "How good are Capacity-on-Demand Offers?", www.Computerwoche.de/536343, Feb. 13, 2003.

*Primary Examiner* — Meng An
*Assistant Examiner* — Mengyao Zhe
(74) *Attorney, Agent, or Firm* — Martin & Associates, LLC; Derek P. Martin

(57) ABSTRACT

A capacity manager provides temporary resources on demand in a manner that assures the temporary resources may be recovered when the specified resource-time expires. Access to minimum resource specifications corresponding to the logical partitions is controlled to prevent the sum of all minimum resource specifications from exceeding the base resources on the system. By assuring the sum of minimum resource specifications for all logical partitions is satisfied by the base resources on the system, the temporary resources may always be recovered when required.

4 Claims, 7 Drawing Sheets

Number of Allocated System Processors: 8
Number of Available System Processors: 0

| Partition Identifier | Processors | | |
|---|---|---|---|
| | Minimum | Current | Maximum |
| 1 | 1 | 2 | 8 |
| 2 | 4 | 5 | 8 |
| 3 | 1 | 1 | 1 |

FIG. 6

Number of Allocated System Processors: 8
Number of Available System Processors: 8

| Partition Identifier | Processors | | |
|---|---|---|---|
| | Minimum | Current | Maximum |
| 1 | 1 | 2 | 8 |
| 2 | 4 | 5 | 8 |
| 3 | 1 | 1 | 1 |

FIG. 7

Number of Allocated System Processors: 16
Number of Available System Processors: 0

| Partition Identifier | Processors | | |
|---|---|---|---|
| | Minimum | Current | Maximum |
| 1 | 4 | 6 | 8 |
| 2 | 4 | 9 | 10 |
| 3 | 1 | 1 | 1 |

FIG. 8    Prior Art

Number of Allocated System Processors: 16
Number of Available System Processors: 0

| Partition Identifier | Processors | | |
|---|---|---|---|
| | Minimum | Current | Maximum |
| 1 | 3 | 6 | 8 |
| 2 | 4 | 9 | 10 |
| 3 | 1 | 1 | 1 |

FIG. 9

Number of Allocated System Processors: 16
Number of Available System Processors: 0

| Partition Identifier | Processors | | |
|---|---|---|---|
| | Minimum | Current | Maximum |
| 1 | 6 | 6 | 8 |
| 2 | 4 | 9 | 10 |
| 3 | 1 | 1 | 1 |

FIG. 10

ASSURING RECOVERY OF TEMPORARY RESOURCES IN A LOGICALLY PARTITIONED COMPUTER SYSTEM

CROSS-REFERENCE TO PARENT APPLICATION

This patent application is a continuation of U.S. Ser. No. 10/616,675 filed on Jul. 10, 2003, which is incorporated herein by reference.

BACKGROUND OF THE INVENTION

1. Technical Field

This invention generally relates to data processing, and more specifically relates to resource management in a logically partitioned computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The eServer iSeries computer system developed by IBM is an example of a computer system that supports logical partitioning. If logical partitioning on an iSeries computer system is desired, partition manager code (referred to as a "hypervisor" in iSeries terminology) is installed that allows defining different computing environments on the same platform. Once the partition manager is installed, logical partitions may be created that define different computing environments. The partition manager manages the logical partitions to assure they can share needed resources in the computer system while maintaining the separate computing environments defined by the logical partitions.

A computer system that includes multiple logical partitions typically shares resources between the logical partitions. For example, a computer system with two logical partitions and a single CPU could be defined that allocates 50% of the CPU to each partition, that allocates 33% of the memory to the first partition and 67% of the memory to the second partition, and that allocates two different I/O slots to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

Recent developments in the computer industry allow a customer to purchase additional resources on demand. In this scenario, a customer purchases a computer system that may include one or more resources that are initially disabled. There are several different ways a manufacturer may then allow a customer to use these additional resources. If the customer desires to permanently upgrade their system to include additional resources, the customer can purchase a software key from the system manufacturer. Entering the software key results in the resource(s) specified in the software key being permanently enabled, as if the system were purchased with these resources enabled. This is known in the art as "permanent capacity upgrade on demand." If the customer does not need permanent use of additional resources, the customer may request an enablement code from the manufacturer to enable these resources for a specified resource-time. This is known in the art as "temporary capacity on demand." The related application "METHOD TO PROVIDE ON-DEMAND RESOURCE ACCESS", Ser. No. 10/406,652 filed on Apr. 3, 2003, discloses a system and method for providing temporary capacity on demand. One way to provide temporary capacity on demand is to enable resources for a specified resource-time, and to disable the resources once the specified resource-time has expired.

Another way to provide temporary access to resources is known as "metered capacity on demand", and is the subject of the related application "APPARATUS AND METHOD FOR PROVIDING METERED CAPACITY OF COMPUTER RESOURCES", Ser. No. 10/616,676 filed on Jul. 10, 2003. When metered capacity on demand is used, a temporary resource is enabled, and only actual use of the resource is billed to the customer.

When either temporary capacity on demand or metered capacity on demand are used, the customer typically enters into a contractual agreement with the manufacturer, who monitors the system to assure the customer is properly billed for the temporary or metered capacity on demand. Another way to provide temporary access to computer system resources is known as "activate immediate", where a customer purchases (or is given on a "trial" basis) an enablement code that includes a specified resource-time, but the customer does not sign a contract and the manufacturer does not monitor the system. Because the manufacturer does not monitor the system, the system is vulnerable to potential tampering by the customer. In an activate immediate scenario, the customer purchases an enablement code for a specified resource-time. The resources are then enabled for the specified resource-time. When the specified resource-time expires, the resources should be recovered (i.e., disabled). However, there are limitations to what the system can do to recover temporary resources due to system integrity and legal considerations. In other words, it would be unacceptable to force recovery of temporary resources because doing so may prevent the computer system from running the customer's workload. This means that certain actions by the customer could prevent the recovery of resources when the specified resource-time expires. For example, if the customer changes the minimum resource specification to a level that includes one or more of the temporary resources, the system may be unsuccessful at recovering all of the temporary resources. In this case, the customer could enjoy permanent enablement of temporary resources without paying the manufacturer for those resources. Without a means to provide temporary resources that are activated immediately on demand that assures these resources may be recovered when the specified resource-time expires, the computer industry will continue to suffer from potential loss of revenue due to abuse by customers in continuing use of temporary resources after the specified resource-time expires.

DISCLOSURE OF INVENTION

A capacity manager provides temporary resources on demand in a manner that assures the temporary resources may be recovered when the specified resource-time expires. Access to minimum resource specifications corresponding to the logical partitions is controlled to prevent the sum of all minimum resource specifications from exceeding the base resources on the system. By assuring the sum of minimum resource specifications for all logical partitions is satisfied by the base resources on the system, the temporary resources may always be recovered when required without impacting the minimum level of service defined by the customer.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIGS. 6-10 each represent the allocation of processors between three logical partitions to illustrate the principles of the preferred embodiments.

BEST MODE FOR CARRYING OUT THE INVENTION

The preferred embodiments provide a significant advance over the prior art by assuring that temporary resources may always be recovered once the time period for enabling the temporary resources expires without impacting the minimum level of service defined by the customer. Access to the minimum resource specification in each logical partition is controlled so the sum of minimum resource specifications for all logical partitions cannot exceed the base resources in the system. Because the sum of minimum resource specifications cannot exceed the available base resources, recovery of all temporary resources is assured.

Figure 1:
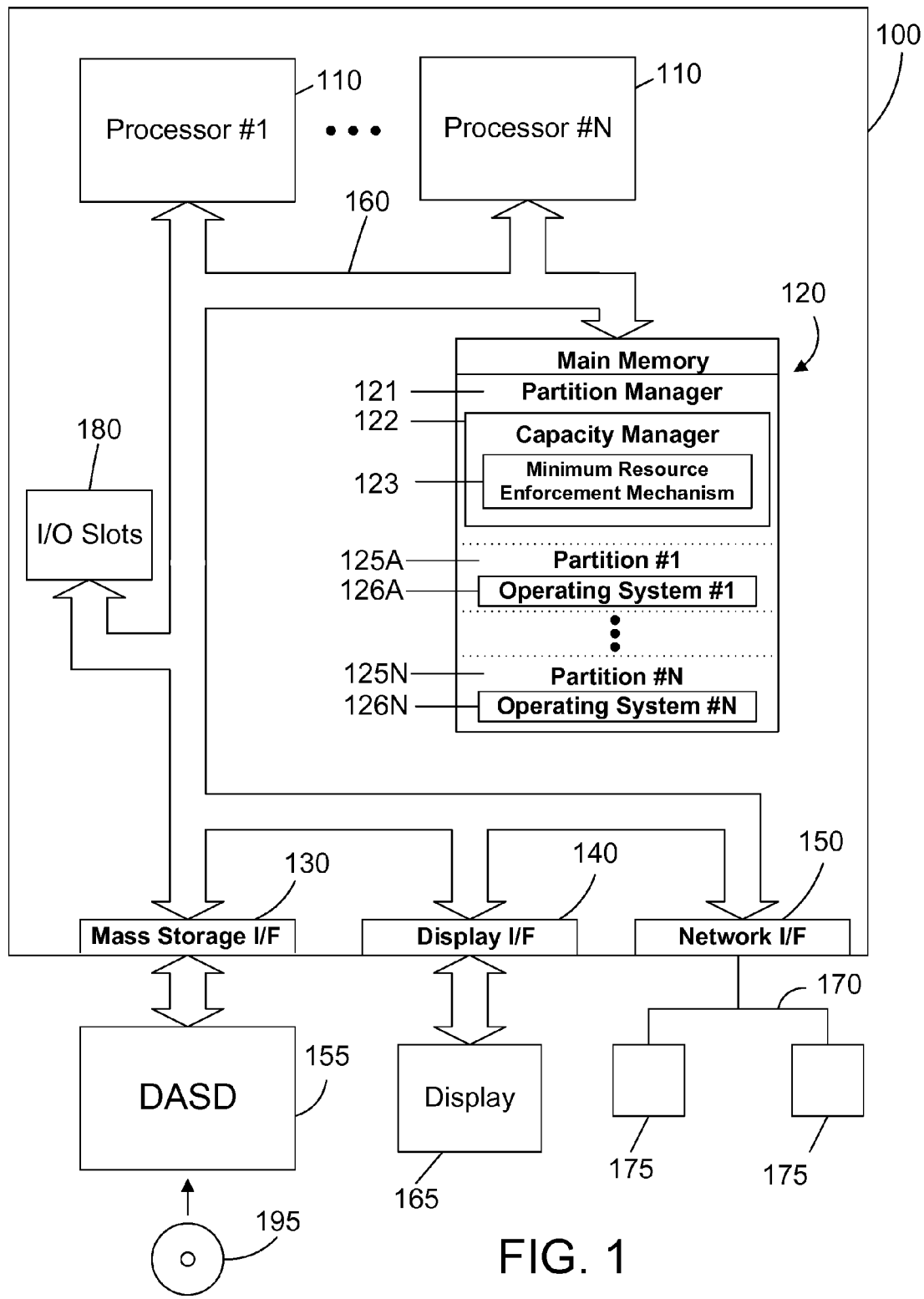
FIG. 1 is a block diagram of a computer apparatus in accordance with the preferred embodiments.

Referring to FIG. 1, a computer system 100 is an enhanced IBM eServer iSeries computer system, and represents one suitable type of computer system that supports logical partitioning in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a plurality of I/O slots 180. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in adapters coupled to I/O slots 180.

Main memory 120 contains a partition manager 121 and N logical partitions 125, shown in FIG. 1 as logical partitions 125A through 125N. Partition manager 121 preferably creates these N logical partitions 125. Each logical partition preferably includes a corresponding operating system 126, shown in FIG. 1 as operating systems 126A through 126N.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner the logical partitions can provide completely different computing environments on the same physical computer system.

The partition manager 121 preferably includes capacity manager 122 that manages temporary resources. Note that the "temporary resources" discussed herein may be provided using "temporary capacity on demand", "metered capacity on demand", or "activate immediate" discussed in the Background Art section above. In addition, the preferred embodiments also extend to any and all ways to provide temporary resources in a computer system, whether currently known or developed in the future. The capacity manager 122 includes a minimum resource enforcement mechanism 123 that assures the sum of all minimum resource specifications on apparatus 100 does not exceed a level that is satisfied by the base resources of apparatus 100. The term "base resources" as used herein refers to the resources that are permanently enabled on apparatus 100, and includes all resources that are enabled when the computer system is acquired, and includes all additional resources that are subsequently permanently enabled. By assuring the minimum resource specification for computer system 100 does not exceed the level of base resources, the capacity manager 122 will always be able to recover temporary resources when the corresponding resource-time expires.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as memory 120 or I/O slots 180. Thus, one partition could be defined to include two processors and a portion of memory 120, along with one or more I/O processors and/or slots that can provide the functions of mass storage interface 130, display interface 140, network interface 150, or interfaces to I/O devices plugged into I/O slots 180. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the partition manager 121 preferably resides in memory and hardware separate from the partitions and include facilities and mechanisms that are not directly available to the partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121 and the partitions 125A-125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Each processor 110 may be constructed from one or more microprocessors and/or integrated circuits. A processor 110 executes program instructions stored in main memory 120. Main memory 120 stores programs and data that a processor 110 may access. When computer system 100 starts up, a processor 110 initially executes the program instructions that make up the partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
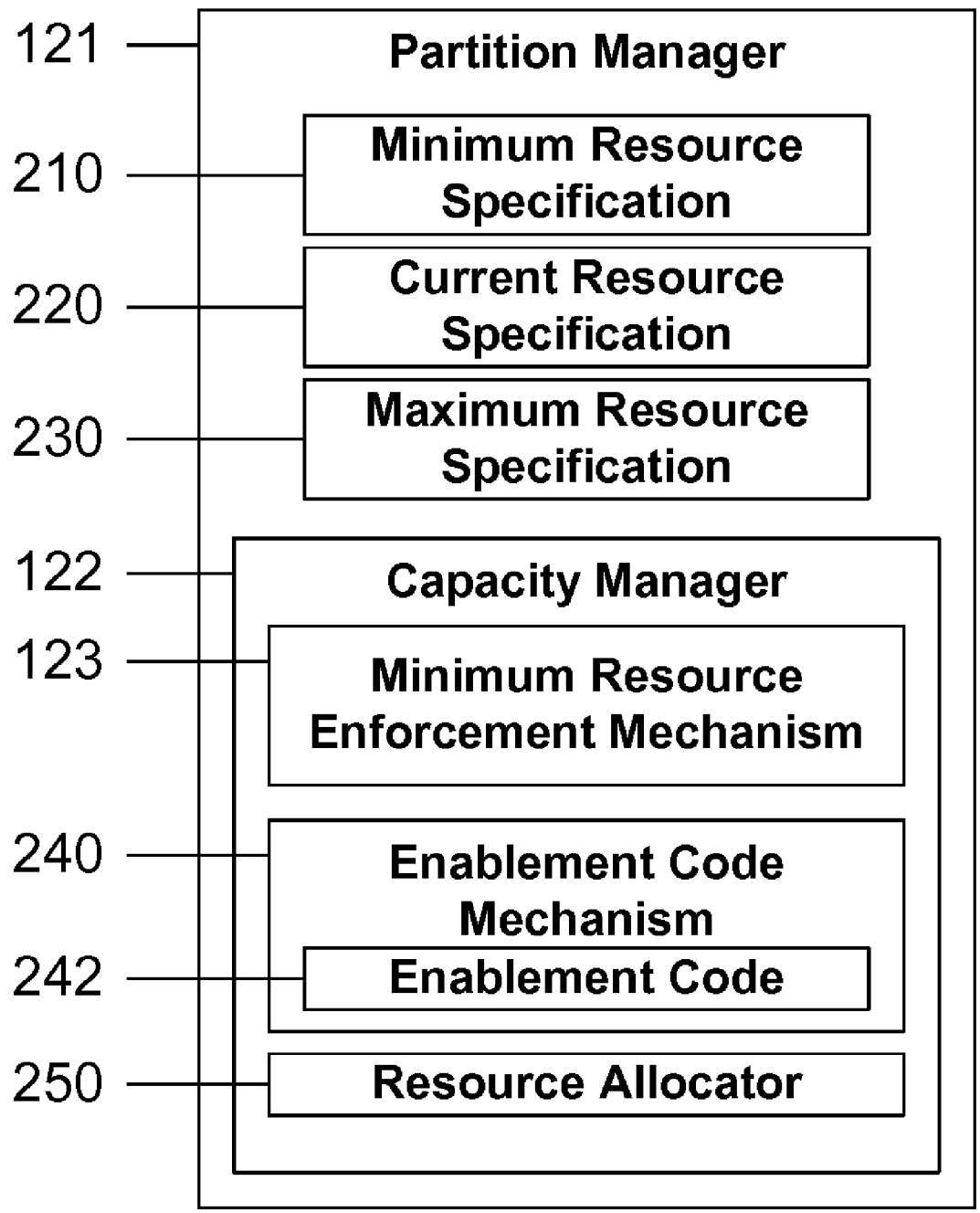
FIG. 2 is a block diagram of the partition manager of FIG. 1.

A more detailed view of the partition manager 121 in FIG. 1 is shown in FIG. 2. Partition manager 121 includes a minimum resource specification 210, a current resource specification 220, and a maximum resource specification 230 for each logical partition. The minimum resource specification 210 specifies the minimum resources defined by the customer that must be available for the logical partition to function correctly. The current resource specification 220 specifies the resources that are currently allocated to the logical partition. The maximum resource specification 230 specifies the maximum resources that may be allocated to the logical partition. The partition manager manages and controls access to the minimum resource specification 210, current resource specification 220 and maximum resource specification 230.

The capacity manager 122 manages temporary resources, whether requested through temporary capacity on demand, metered capacity on demand, activate immediate, or some other scheme. The capacity manager 122 includes an enablement code mechanism 240, which is used to determine whether an enablement code 242 is valid, and to enable one or more resources when the enablement code is determined to be valid. The capacity manager 122 also includes a resource allocator 250, which is the mechanism that allocates resources for use. Thus, when the enablement mechanism 240 determines that an enablement code 242 is valid, the resource allocator 250 makes the corresponding resource(s) available for use.

The minimum resource enforcement mechanism 123 in capacity manager 122 controls access to the minimum resource specification 210 in each logical partition to assure the sum of all minimum resource specifications 210 for all logical partitions does not exceed the base resources in the system. If the sum of minimum resource specifications 210 is maintained at a level that can always be satisfied by the base resources of the computer system, the temporary resources can always be recovered without impacting the level of service defined by the customer.

Figure 3:
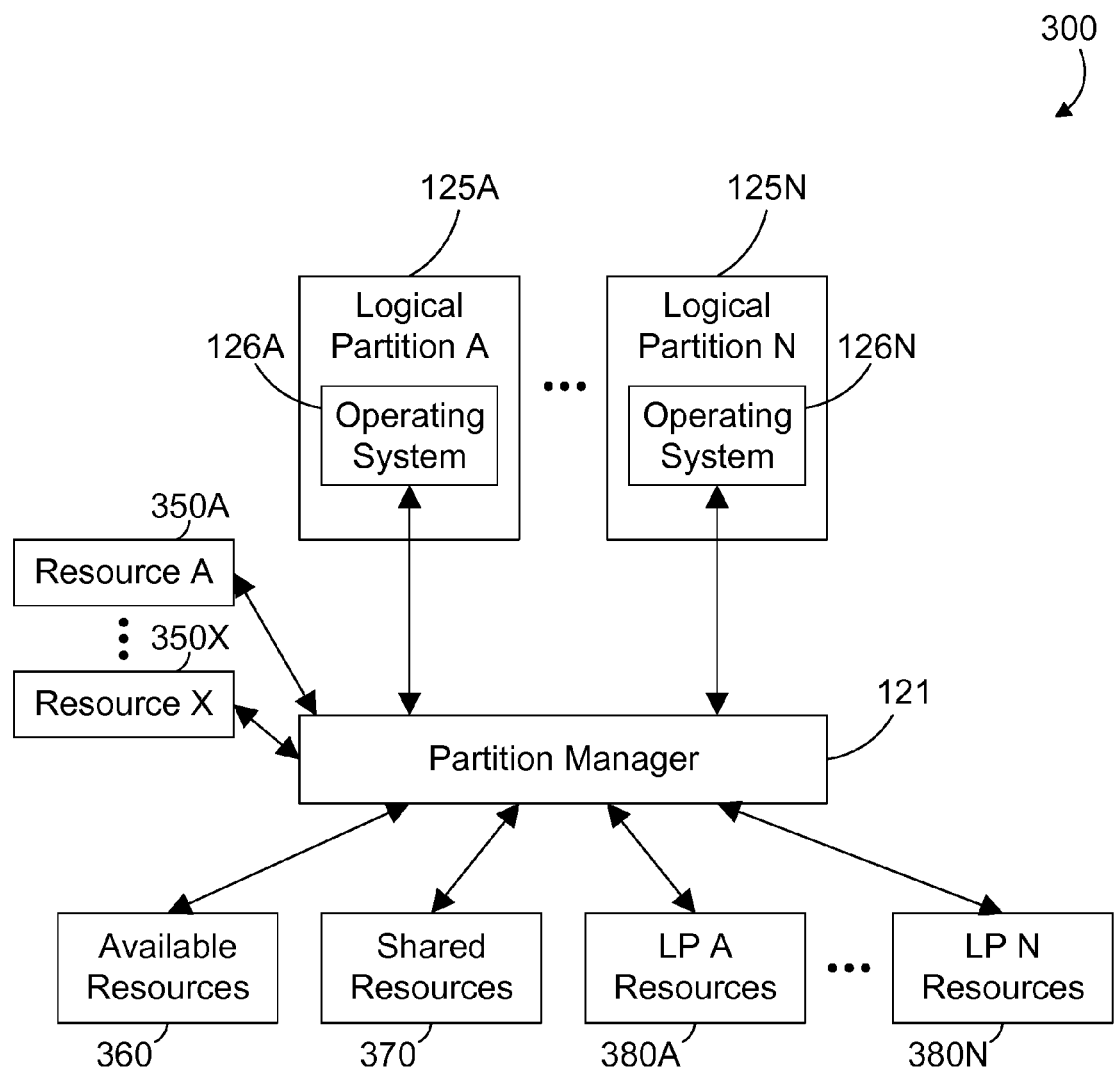
FIG. 3 is a block diagram showing logical components in a logically partitioned computer system.

While FIG. 1 shows a sample computer system that includes some of the salient features of both hardware and software in accordance with the preferred embodiments, a more detailed logical view of some of the components in FIG. 1 is shown as system 300 in FIG. 3. In system 300, N logical partitions 125A-125N are shown executing their respective operating systems 126A-126N. The logical partitions are managed by a partition manager 121. Partition manager 121 manages resources 350, shown in FIG. 3 as resource 350A through resource 350X. A "resource" in this context may be any hardware or software that may be controlled by partition manager 340. Examples of hardware resources include processors, memory, and hard disk drives. Examples of software resources include a database, internal communications (such as a logical LAN), or applications (such as word processors, e-mail, etc.). The partition manager 121 controls which resources 350 may be used by the logical partitions. A resource, once made available to the partition manager 121, is categorized as an available resource 360 if it has not yet been assigned to a logical partition, is categorized as a shared resource 370 if multiple logical partitions may access the resource, and is categorized as a dedicated resource 380 if it has been exclusively assigned to a logical partition. FIG. 3 shows dedicated resources 380A . . . 380N that correspond to each logical partition 125A . . . 125N.

Figure 4:
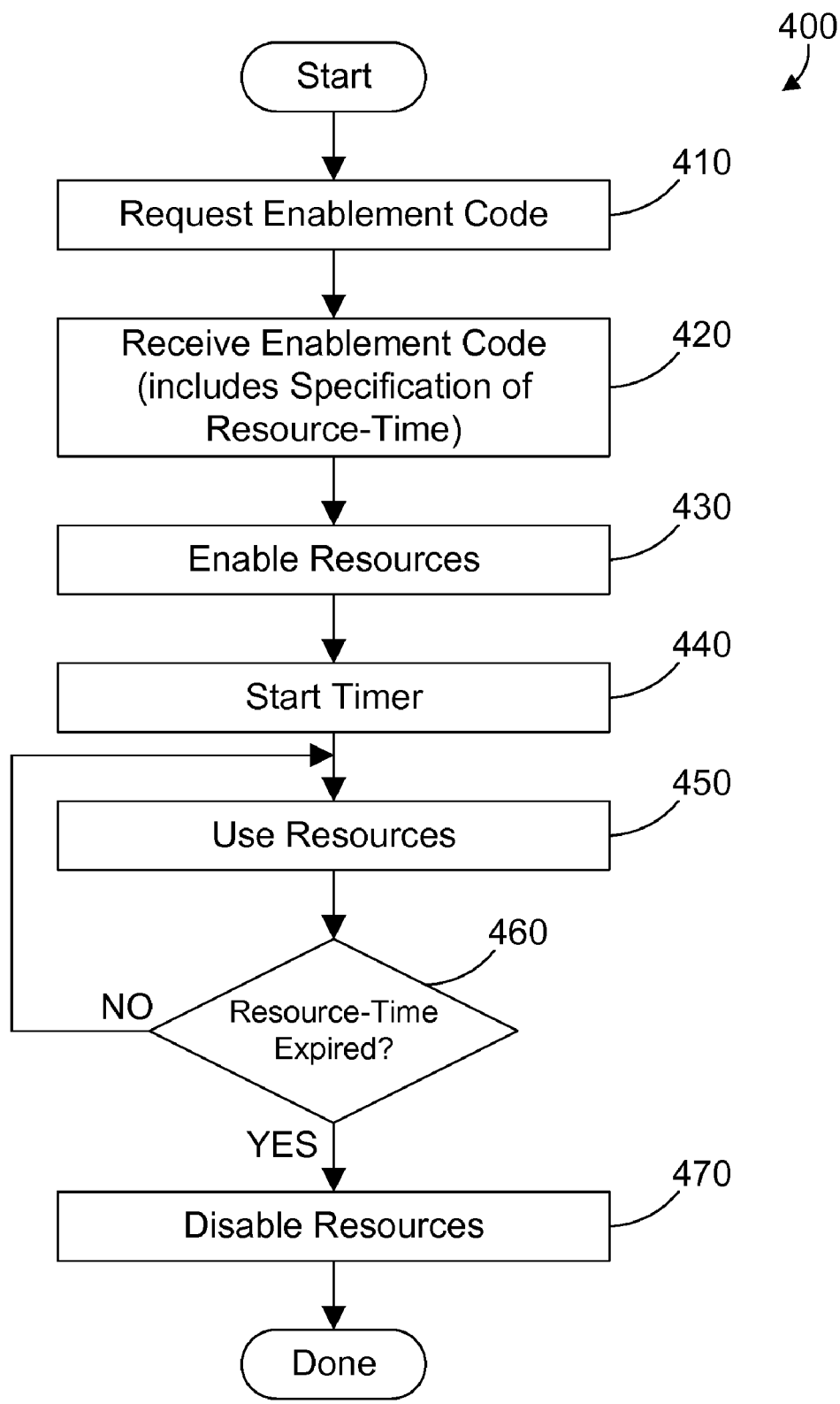
FIG. 4 is a flow diagram of a method for providing temporary resources on demand.
Figure 5:
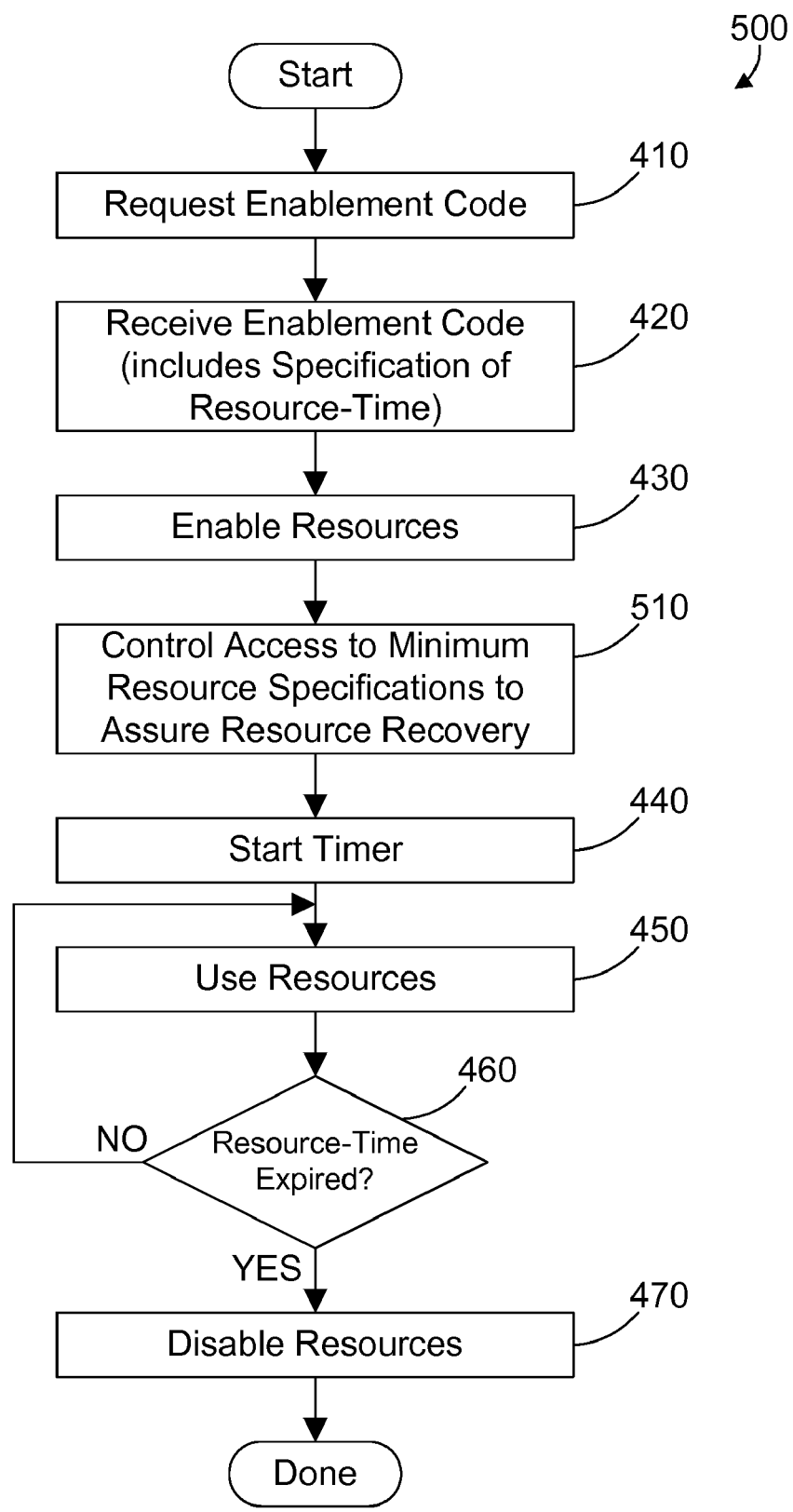
FIG. 5 is a flow diagram of a method in accordance with the preferred embodiments for providing temporary resources on demand in a manner that assures the temporary resources may be recovered.

Referring to FIG. 4, a flow diagram of one suitable method 400 for providing temporary resources on demand begins by the customer requesting an enablement code from the manufacturer (step 410). The customer receives the enablement code, which includes a specification of resource-time (step 420). The term "resource-time" is a general term that allows specifying any resource or combination of resources for any suitable period of time. One example of resource-time is processor-days. The customer enters the enablement code, which enables the resources on the computer system (step 430). A timer is then started (step 440). The user may then use the resources (step 450) as long as the resource-time has not expired (step 460=NO). Once the resource-time expires (step 460=YES), the resources are disabled (step 470).

A simple example will show the usefulness of method 400. Let's assume that a company that sells goods via catalog sales experiences peak demand in November and December of each year due to holiday shopping. The company could purchase a computer system that has one or more additional processors that are installed but initially disabled. The company could then contract with the provider of the computer system to enable the additional processor(s) for a set period of time. Let's assume that the computer system has two additional processors, and let's assume that the peak buying period runs for the thirty day period from November $15^{th}$ to December $14^{th}$. The customer could purchase sixty processor-days of additional capacity beginning on November 15. These two additional processors will then be enabled for the thirty day period (providing the sixty processor-days of additional capacity). Once the sixty processor-days have elapsed, the two additional processors are disabled.

When the usage of temporary resources is monitored by the manufacturer, the manufacturer can assure the customer is appropriately billed for the temporary resources. However, in an activate immediate scenario, the system is not monitored by the manufacturer. This could lead to loss of revenue due to abuses by customers that use temporary capacity for a period of time that is greater than the specified resource-time. This could happen, for example, if the sum of minimum resource specifications for the logical partitions is increased to a level that can only be satisfied by using temporary resources (i.e., that cannot be satisfied by only base resources). When the resource-time expires (step 460=YES), method 400 will attempt to disable the temporary resources (step 470). However, if the sum of minimum resource specifications requires use of temporary resources, the capacity manager may be unable to disable (or recover) all of the temporary resources. For this reason, some mechanism is needed to assure that temporary resources can always be recovered. This is the subject matter of the preferred embodiments.

A method 500 in accordance with the preferred embodiments includes all of the steps in method 400 discussed above with reference to FIG. 4. Note, however, that method 500 additionally includes step 510, which controls access to minimum resource specifications corresponding to the logical partitions to assure temporary resources may be recovered. By controlling access to the minimum resource specifications for the logical partitions, method 500 assures the minimum resource specifications may be satisfied by only base resources, thereby creating a state where the temporary resources can always be recovered. Some examples will follow to illustrate these concepts.

We assume for this example that a computer system has three logical partitions, designated 1, 2 and 3. We assume that the base system includes eight processors, all of which have been allocated to the logical partitions, as shown by the current processor specification column in FIG. 6, which shows that partition 1 has 2 processors, partition 2 has 5 processors, and partition 3 has 1 processor. Let's assume that a customer now pays for the temporary use of eight additional processors using the activate immediate scenario described above. As shown in FIG. 7, these additional processors may then be made available to the partition manager by designating these eight temporary processors as available resources 360 shown in FIG. 3. Once these eight temporary processors are designated as available resources 360, they may be allocated to the logical partitions, either as shared resources 370 or as dedicated processors 380. We assume for this example these eight temporary processors are allocated as dedicated processors 380, as shown in FIG. 8, which shows logical partition 1 with 6 processors, partition 2 with 9 processors, and partition 3 with 1 processor. The problem with prior art implementations is shown in FIG. 8, where the minimum processor capacity for the logical partitions has been increased to a level where the sum exceeds the base system processors. The total of processors in the minimum processor specification for the three partitions equals nine. Note, however, that only eight of the sixteen processors currently in use are base processors. As a result, when the specified processor-time that was purchased by the customer expires, the system will attempt to recover the eight temporary processors. But the problem lies in the sum of minimum processor specifications, which now equals nine in FIG. 8, in excess of the eight base processors. As a result, the prior art would succeed in recovering only seven of the eight temporary processors. The eighth would remain available for the customer to use because it is required according to the sum of minimum processor specifications. This could lead to a customer using a temporary resource on a permanent basis without paying the manufacturer for continued use of that resource.

The preferred embodiments eliminates this problem in the prior art by controlling access to the minimum resource specifications so the sum of the minimum resource specifications never exceeds the level of base resources on the system. Thus, for the example in FIGS. 6 and 7, the minimum processor specifications may be changed, as shown in FIG. 9, but the sum of these minimum processor specifications cannot exceed the eight base system processors. Thus, we see in FIG. 9 that the minimum processor specification for partition 1 has increased from 1 to 3, but the total processors in the minimum processor specifications (3 for partition 1, 4 for partition 2, and 1 for partition 3) is still less than or equal to the eight base processors.

Now let's assume that the customer decides to make three of the temporary processor permanent by paying the manufacturer for permanent usage of three processors. The customer receives a key that, once entered into the system, permanently enables three of the eight temporary processors. In this example, the number of base processors has increased from eight to eleven. As a result, the sum of minimum processor specifications may now increase to eleven. Thus, in FIG. 10, partition 1 has a minimum processor specification of 6, partition 2 has a minimum processor specification of 4, and partition 3 has a minimum processor specification of 1, for a total of eleven processors, which still equals the number of base processors in the system. In the preferred embodiments, the partition manager is inhibited from changing a minimum resource specification to a value that would cause the sum of minimum resource specifications for all partitions to exceed the base resources in the system.

By controlling access to minimum resource specifications so their sum does not exceed the base resources of the system, the preferred embodiments achieve a system where temporary resources may always be recovered after a specified resource-time expires. This eliminates potential loss of revenue and thus enhances the revenue generation of providing computer systems with the ability to provide temporary resources on demand.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
   at least one processor;
   a memory coupled to the at least one processor;
   a plurality of logical partitions defined on the apparatus;
   a partition manager residing in the memory and executed by the at least one processor, the partition manager managing the plurality of logical partitions, the partition manager comprising:
   (A) a minimum resource specification for each of the plurality of logical partitions that specifies minimum resources that must be available for a logical partition corresponding to the minimum resource specification to function correctly;
   (B) a capacity manager that manages at least one temporary resource on demand for a specified resource-time for at least one of the plurality of logical partitions, the capacity manager comprising:
      a minimum resource enforcement mechanism that reads a minimum resource specification for each of the plurality of logical partitions, each minimum resource specification specifying minimum resources that must be available for a corresponding logical partition to function correctly, the minimum resource enforcement mechanism determining a total of resources that are permanently enabled in the computer system, and in response to a request by one of the plurality of logical partitions requesting to increase a minimum resource specification corresponding to the one logical partition, the minimum resource enforcement mechanism determining whether the requested increase in the minimum resource specification corresponding to the one logical partition will cause a sum of all minimum resource specifications for all of the plurality of logical partitions to exceed the total of resources that are permanently enabled in the computer system, and if the requested increase in the minimum resource specification corresponding to the one logical partition will cause a sum of all minimum resource specifications for all logical partitions to exceed the total of resources that are permanently enabled in the computer system, the minimum resource enforcement mechanism denying the requested increase in the minimum resource specification corresponding to the one logical partition, and if the requested increase in the minimum resource specification corresponding to the one logical partition will not cause the sum of all minimum resource specifications for all logical partitions to exceed the total of resources that are permanently enabled in the computer system, the minimum resource enforcement mechanism permitting the requested increase in the minimum resource specification corresponding to the one logical partition; and
   (C) a resource allocator that enables the at least one temporary resource, and recovers the at least one temporary resource when the specified resource-time has expired.

2. The apparatus of claim 1 wherein the partition manager further comprises: an enablement code mechanism that evaluates an enablement code to determine whether the code is valid, wherein the enablement code includes the specified resource-time.

3. A computer readable program product stored on a non-transitory computer storage medium comprising:
   (A) a partition manager comprising:
      (A1) a minimum resource specification for each of a plurality of logical partitions that specifies minimum resources that must be available for a logical partition corresponding to the minimum resource specification to function correctly;
      (A2) a capacity manager that manages at least one temporary resource on demand for a specified resource-time in a computer system that includes a plurality of logical partitions, the capacity manager comprising:
         (A2a) a minimum resource enforcement mechanism that controls access to the minimum resource specification for each of the plurality of logical partitions by not allowing a sum of all the minimum resource specifications for all of the plurality of logical partitions to exceed a total of resources that are permanently enabled in the computer system to assure the at least one temporary resource may be recovered when the specified resource-time has expired;
      (A3) a resource allocator that enables the at least one temporary resource,
      and recovers the at least one temporary resource when the specified resource-time has expired.

4. The program product of claim 3 wherein the partition manager further comprises:
   an enablement code mechanism that evaluates an enablement code to determine whether the code is valid, wherein the enablement code includes the specified resource-time.

* * * * *